United States Patent [19]
Reynard

[11] 4,380,807
[45] Apr. 19, 1983

[54] ECHO RECOGNITION SYSTEM

[75] Inventor: John M. Reynard, Framingham, Mass.

[73] Assignee: Polaroid Corporation, Cambridge, Mass.

[21] Appl. No.: 266,901

[22] Filed: May 26, 1981

Related U.S. Application Data

[63] Continuation of Ser. No. 81,357, Oct. 3, 1979, abandoned.

[51] Int. Cl.$^3$ .......................... G01S 7/66; G01S 15/04
[52] U.S. Cl. .................................. 367/97; 343/5 VQ
[58] Field of Search ..................... 367/96, 97, 99, 901, 367/100; 343/5 VQ; 364/517

[56] References Cited

U.S. PATENT DOCUMENTS

| | | | |
|---|---|---|---|
| 3,098,210 | 7/1963 | Sparling et al. | 367/97 |
| 3,351,896 | 11/1967 | Rowlands | 367/100 X |
| 3,562,703 | 2/1971 | Grada | 367/97 |
| 4,014,018 | 3/1977 | Williams et al. | 343/5 VQ |
| 4,145,914 | 3/1979 | Newman | 367/99 |
| 4,199,246 | 4/1980 | Muggli | 367/96 |

FOREIGN PATENT DOCUMENTS 1433766  4/1976  United Kingdom .................. 367/97

*Primary Examiner*—Richard A. Farley
*Attorney, Agent, or Firm*—John J. Kelleher

[57] ABSTRACT

An echo-type range finding system is rendered unresponsive to spurious signals and electronic noise, and has its object distance determining accuracy improved by rejecting signals that do not persist for a predetermined period of time.

10 Claims, 11 Drawing Figures

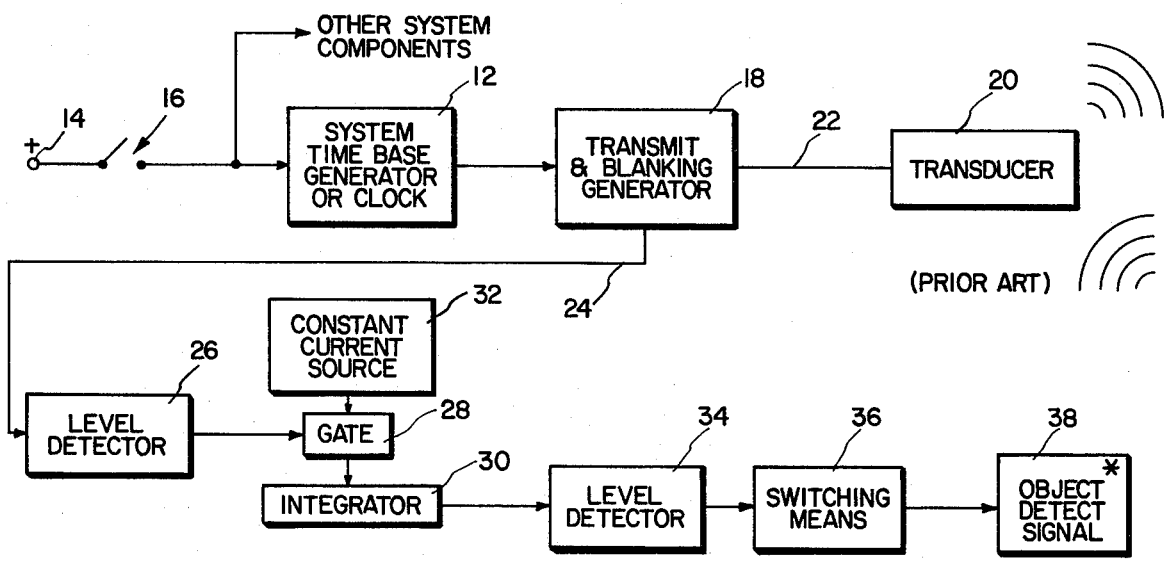
FIG. 1
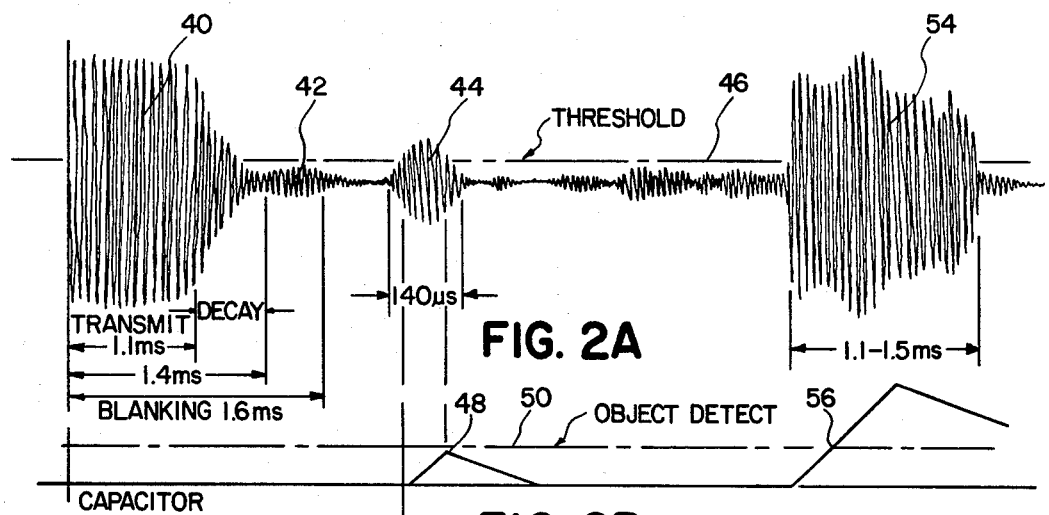
FIG. 2A
FIG. 2B
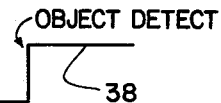
FIG. 2C

ECHO RECOGNITION SYSTEM

This is a continuation of application Ser. No. 081,357, filed Oct. 3, 1979 now abandoned.

BACKGROUND OF THE INVENTION

1. Field of the Invention

The present invention relates to means for rendering an echo-type range finding system insensitive to spurious signals and/or electronic noise and for improving the distance determining accuracy of said system, in general, and to such means in an ultrasonic range finding system, in particular.

2. Description of the Prior Art

In apparatus employing a range finding system, such as the ultrasonic range finding system included in the automatically focused camera described in U.S. patent application Ser. No. 3,371, Jan. 15, 1979, by J. MUGGLI, now U.S. Pat. No. 4,199,246 a reflection or echo of a portion of a burst of ultrasonic energy, previously transmitted by said camera, is sensed by the camera's range finding system for the purpose of regulating the camera's automatic focusing system in accordance with a signal representative of the total flight time of said burst of ultrasonic energy. Range finding systems such as that described in said MUGGLI application are susceptible to spurious signals and/or electronic noise sensed or generated by said range finding system. If a spurious signal is sensed by a camera's range finding system after the transmission of a burst of object detecting energy, but before a true or actual object echo can be received by said system, a misfocusing of the camera's lens by said automatic focusing system would result.

In order to reduce the sensitivity of the range finding system described in said MUGGLI application to spurious signals and/or electronic noise, all received signals above a threshold level are integrated by an integrating capacitor. An object detect signal is not generated until the voltage of this capacitor exceeds a predetermined trigger level. However, the duration and shape of a received object detection signal is dependent upon several variables that include object distance, object shape, path length differences of portions of a reflected signal, etc., and therefore, the use of such an integrator to reduce sensitivity to spurious signals can introduce distance errors into the range finding system.

Spurious signals can emanate from a number of different sources. In, for example, the range finding system described in the above-cited MUGGLI application, ultrasonic energy is both transmitted and received by a combination transmitting and receiving, capacitance-type, electrostatic transducer. This type of transducer includes a vibratile diaphragm that vibrates and transmits a burst of ultrasonic energy in response to a series of high frequency input signals, and also vibrates when it receives an echo of a previously transmitted burst of ultrasonic energy, causing the transducer to generate a relatively low level receive or object detect signal at its output. This type of transducer has common input and output signal terminals and, therefore, the circuitry that responds to a receive signal must be blanked or rendered insensitive to signals appearing at the transducer input/output terminals during the transmit mode. This receive circuitry blanking means is removed sometime after the transmit signal is terminated. In some transducers, the vibrating diaphragm will break into oscillations or "beat" after diaphragm vibrations have fully decayed and after the receive circuitry has been unblanked or made sensitive to signals appearing at the transducer input/output terminals. This diaphragm "beating" is one type of spurious object detection signal that can, for example, cause the lens misfocusing problem mentioned above.

The object detection system described in the above-cited MUGGLI application for an automatic focusing camera also includes a variable gain receiver amplifier whose gain is changed, in a series of discrete steps, as a function of the time of flight of a burst of ultrasonic energy. Amplifier gain is increased in this manner to compensate for the difference in magnitude between the echo signals received from close objects and the substantially less intense echo signals that are received from remote objects. When the amplifier gain is changed in a series of steps, as mentioned above, electronic noise, of relatively short duration, appears from time to time at these gain step change points, thereby producing a source of electronic noise that can cause false triggering and therefore misfocusing of the camera's automatic focusing system.

The amplitude of all of the spurious signals and electronic noise described above are time-dependant, and exist for a relatively short period of time. For example, the spurious signals generated by the above-described transducer "beating" phenomenon and the electronic noise generated by the receiver amplifier at its gain step change points are in the order of 200 microseconds.

SUMMARY OF THE INVENTION

In accordance with the teachings of the present invention, an echo-type range finding system is provided that is able to consistently identify the leading edge of a returning object detection signal or echo, and distinguish between actual and spurious object detection signals. To identify said leading edge and distinguish between said signals, all received signals are repeatedly sampled and summed during time intervals that are small relative to the overall receive signal duration, to establish that the magnitude of said signals increase, and increase at or above a predetermined rate. An actual object detection signal is generated by the range finding system if the magnitude of the sum of the samples of said sampled signal increases from sample to sample, and increases at or above said predetermined rate for a period of time that is related to a major time portion of an echo signal from a selected target. The range finding system of the present invention is made relatively insensitive to spurious signals and/or electronic noise, in part, by monitoring receive signal duration rather than its amplitude. Object distance errors are readily removable by electronic or mechanical means because the error or time delay introduced into the range finding system by the above-mentioned sampling scheme is the same for all detected objects.

BRIEF DESCRIPTION OF THE DRAWINGS

FIG. 1 is a block diagram that primarily shows the spurious signal rejection portion of an ultrasonic range finding system in accordance with the prior art.

FIG. 2A shows a typical transmit/receive signal that initially appeared at the input/output terminals of an electrostatic transducer in an ultrasonic range finder, after said signal has been amplified.

FIG. 2B is a graph of voltage as a function of time on the spurious signal rejecting integrating capacitor in the prior art ultrasonic range finder of FIG. 1

FIG. 2C is a graph of voltage as a function of time at the output of the switching means in FIG. 1 that is responsive to the integrating capacitor voltage depicted in FIG. 2B.

DESCRIPTION OF THE PREFERRED EMBODIMENTS

Figure 3:
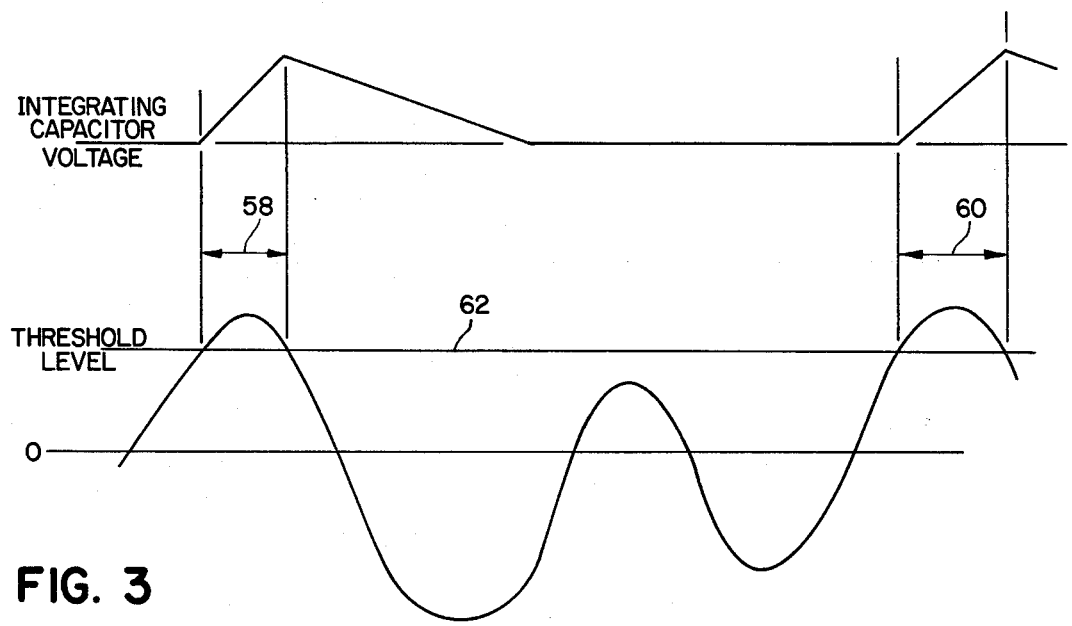
FIG. 3 is an enlarged detail of a transmit/receive signal and of the voltage on an integrating capacitor similar to that depicted in FIGS. 2A and 2B, respectively.

The preferred embodiment of the present invention will be described with frequent reference to the ultrasonic range finder described in the above-cited MUGGLI application and, therefore, in order to facilitate describing the preferred embodiment of the present invention, the spurious signal rejecting means in said ultrasonic range finder, a block diagram of which is shown in FIG. 1, will be discussed in some detail. A detailed explanation of the complete ultrasonic range finder in which said signal rejecting means is employed is provided in said MUGGLI application.

Referring now to FIG. 1 and to the prior art spurious signal rejection portion of an ultrasonic range finder depicted therein, system time base generator or clock 12 is connected to a battery (not shown) attached to terminal 14 through two-position manually actuatable switch 16. When switch 16 is actuated to its closed position, a high frequency oscillator in system time base generator 12 is energized and its divided-down output provides the time base or reference for all time related range finder functions. The closure of switch 16 also connects other range finder system components to terminal 14. When system time base generator or clock 12 is energized by the closure of switch 16, the output of clock 12 is routed to transmit and blanking generator 18, causing said generator 18 to apply the appropriate signal to the input/output terminals of electrostatic transducer 20 through path 22, which, in turn, causes said transducer 20 to transmit a burst of ultrasonic energy toward an object to be detected.

The receive portion of the range finder is connected to transducer 20 through transmit and blanking generator 18, a full wave rectifier (not shown) and path 24. Inasmuch as the input and output terminals of transducer 20 are common to one another, it is essential that all transmit signals be prevented from entering path 24 so that the range finder receiver will not confuse a transmit signal with an echo of said transmit signal. This is accomplished by blanking circuitry in transmit and blanking generator 18 that prevents signals from entering path 24 while a transmit signal is present at the input/output terminals of transducer 20 and, because of transmit signal decay time, for a short time thereafter.

When path 24 is not blanked, an electrical signal generated by transducer 20 upon receipt of an echo of a previously transmitted burst of ultrasonic energy, is routed to path 24 through a full wave rectifier (not shown) and transmit and blanking generator 18. When the receive signal on path 24 equals or exceeds a predetermined magnitude, as determined by level detector 26, said detector 26 turns on gate 28, thereby connecting integrator capacitor 30 to constant current source 32. When the magnitude of the voltage on integrating capacitor 30 equals or exceeds a predetermined magnitude, as determined by level detector 34, switch means 36, in the form of, for example, a schmitt trigger, conducts and generates object detect signal 38 at its output. Object detect signal 38 is subsequently combined with other range finder signals to determine object distance, an operation that is not essential to the operation of the above-described spurious signal rejecting means. The details of the distance determining portion of the range finder are provided in the above-cited MUGGLI application and/or materials cited therein. A better understanding of the operation of the prior art spurious signal rejecting means of FIG. 1 may be acquired by additionally referring to the typical transmit/receive object detecting signal shown in FIG. 2A and how the voltage on the integrating capacitor incorporated in said signal rejecting means changes in response to said signal, as shown in FIG. 2B, to generate the object detect step voltage shown in FIG. 2C. FIG. 2A is an oscilloscope trace of an actual transmit/receive object detection signal initially appearing at the input/output terminals of an electrostatic transducer 20 (FIG. 1), after said signal has been amplified.

Multiple-frequency transmit signal 40 having several frequencies in the neighborhood of 50–60 KHz is applied to the input/output terminals of transducer 20 for 1.1 ms. Vibrations of the diaphragm in transducer 20 fully decay in about an additional 0.3 ms. Previously explained transducer "beating" occurred at 42 and 44 after the vibration in the diaphragm of transducer 20 have fully decayed. The initial "beating" at 42 is less than the threshold level established by level detector 26 and therefore the voltage on the integrating capacitor in integrator 30 remains at its initial zero value. Even if the magnitude of the voltage resulting from "beating" 42 exceeded threshold level 46, very little of it would have caused the charging of integrator 30 from constant current source 32 because the input to the range finder receiver was "blanked" for a total of 1.6 ms. Blanking renders the range finder receiver insensitive to all signals appearing at the input/output terminals of transducer 20. A second "beating" occurs at 44 and the magnitude of the voltage resulting from said "beating" exceeds threshold level 46 established by level detector 26, causing integrator 30 to be charged from constant current source 32 for the period of time that the voltage resulting from "beating" 44 exceeds threshold level 46. In this instance, the voltage on the integrating capacitor and integrator 30 increases, but peaks at 48, slightly below object detect or trigger level 50, a level that is established by level detector 34, and then linearly decreases to zero without generating object detect signal 38. Additional spurious signals caused by reflections from off-axis objects within the side lobes of transducer 20 that are closer to the transducer than the main target, appear at 52 but their magnitudes are less than threshold level 46. Finally, actual receive signal 54 exceeds threshold level 46 established by level detector 26 for a sufficient period of time to cause the voltage on the integrating capacitor in integrator 30 to reach object detect or trigger level 50 at 56, causing level detector 34 to actuate switching means 36 to its conducting state and generate object detect signal 38 at its output.

The integrating capacitor in integrator 30 integrates whenever the amplified voltage resulting from either an actual or apparent object detection signal exceeds threshold level 46, as previously explained. Whenever the magnitude of the apparent or actual received signal voltage drops below threshold level 46, the voltage on said integrating capacitor linearly decays toward zero. The voltage on the integrating capacitor of integrator 30 and a time expanded portion of a receive signal that results in such a capacitor voltage are shown in FIG. 3. During times 58 and 60, the amplified received signal voltage equals or exceeds threshold level 62 and causes the integrating capacitor to linearly increase as it is charged from constant current source 32. At all other times, the integrating capacitor voltage either decreases to or remains at the zero voltage level. Because of the relatively slow decay time associated with integrating capacitor 30 (FIG. 1) after a spurious signal drops below threshold level 62, said threshold level 62 tends to be relatively high in order to minimize integrating capacitor charging by a spurious signal that might combine with a subsequent spurious signal to cause false object detection signal triggering.

Figure 4A:
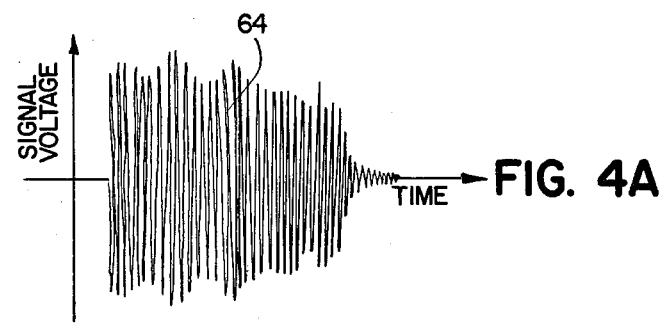
FIG. 4A is a representation of an actual object detection signal returning from a relatively close object initially appearing at the input/output terminals of an electrostatic transducer in an ultrasonic range finder, after said signal has been amplified.
Figure 4B:
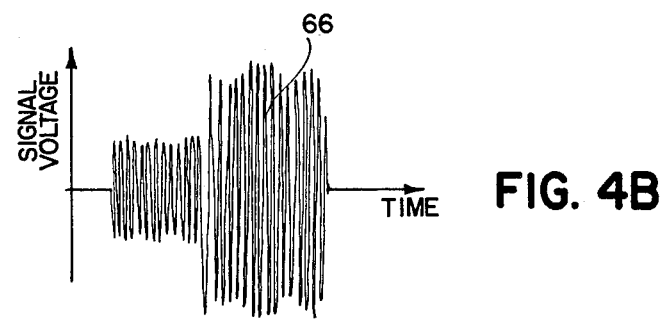
FIG. 4B is a representation of an actual object detection signal returning from a relatively remote object initially appearing at the input/output terminals of an electrostatic transducer in an ultrasonic range finder, after said signal has been amplified.

In addition, typical amplified receive signals from a target object may look like those depicted in FIGS. 4A or 4B. Receive signal 64 in FIG. 4A starts off and remains at a relatively high average value while receive signal 66 in FIG. 4B starts off at a relatively low average value and then increases to a relatively high average value. Signal 64 is characteristic of an echo from a close object whereas signal 66 is characteristic of an echo from a relatively remote object. This difference in echo or receive signal magnitude could cause integrator 30 to start integrating sooner or later, depending upon signal shape, which introduces variable, distance determining errors into the range finding system. These errors are of more concern for low level signals near the threshold level established by level detector 26 than they are for signals of substantially greater magnitude. The reason for these errors can be readily seen by referring to the two, time expanded, receive signals superimposed on one another in FIG. 5.

Figure 5:
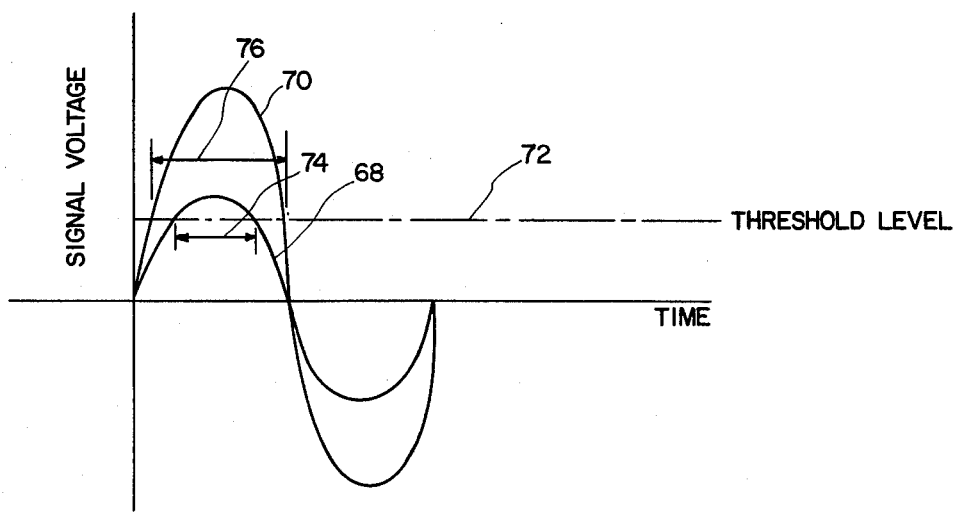
FIG. 5 is an enlarged detail of two object detection signals having the same frequency, but having substantially different magnitudes, that are superimposed on one another.

In FIG. 5, a single cycle of receive signals 68 and 70 having the same frequency are artificially superimposed on one another to facilitate explaining why a receive or echo signals having substantially different magnitudes introduce distance determining errors into a range finding system having the spurious signal rejecting means of FIG. 1. When signal 68 equals or exceeds threshold level 72, a level that would, for example, be established by level detector 26 in FIG. 1, the integrating capacitor in integrator 30 would be charged at a constant rate for a period of time corresponding to time 74. However, signal 70 whose magnitude is substantially greater than that of signal 68, could cause the integrating capacitor in integrator 30 to charge for a longer period of time or the period of time corresponding to time 76. This difference in charging time causes an integrating capacitor voltage difference that renders the accuracy of the measured object distance dependent upon signal magnitude.

Figure 6:
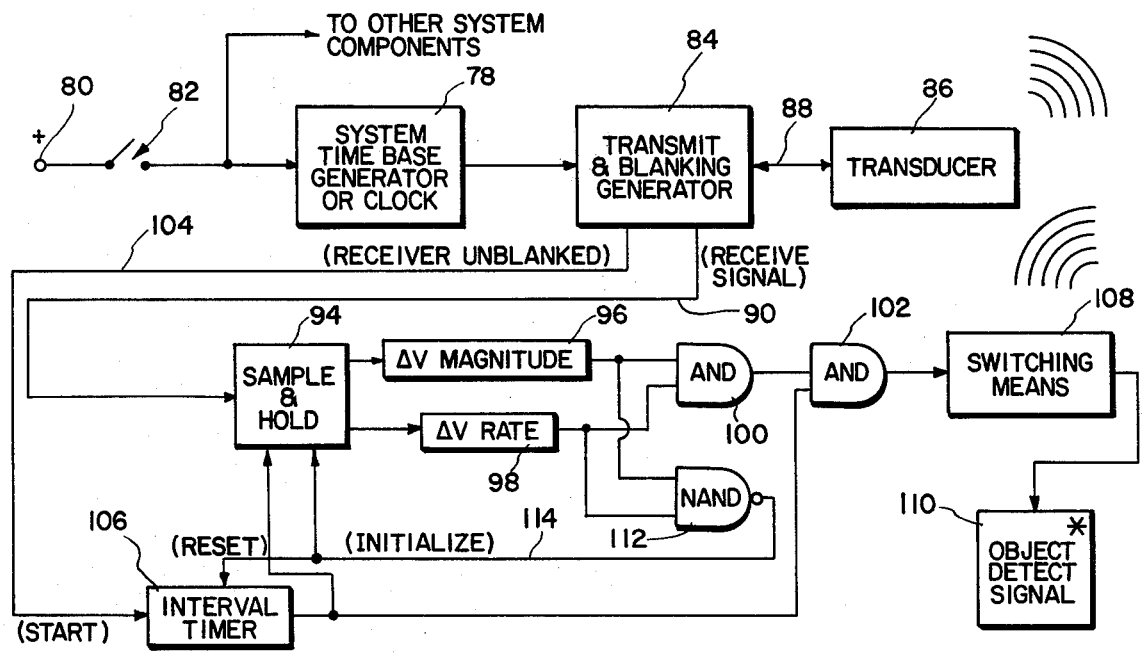
FIG. 6 is a block diagram that primarily shows the spurious signal rejection portion of an ultrasonic range finding system in accordance with the present invention.

Turning now to the present invention and specifically to FIG. 6 of the drawings, a block diagram showing the spurious signal and electronic noise rejecting portion of an ultrasonic range finding system in accordance with the teachings of the present invention, is depicted. In FIG. 6, system time base generator or clock 78 is connected to a battery (not shown) attached to terminal 80 through two-position manually actuatable switch 82. When switch 82 is actuated to its closed position, a high frequency oscillator in system time base generator 78 is energized and its divided-down output provides the time base or reference for all time related range finder functions. The closure of switch 82 also connects other range finder system components to terminal 80. After system time base generator 78 has been energized, its output is routed to transmit and blanking generator 84 causing said generator 84 to apply the appropriate signal to the input/output terminals of electrostatic transducer 86 through path 88, causing said transducer 86 to transmit a burst of ultrasonic energy toward an object to be detected. The receiver portion of the range finder is connected to transducer 86 through path 90, a full wave rectifier (not shown) and transmit and blanking generator 84. As previously explained with respect to the prior art spurious signal rejecting means of FIG. 1, it is essential that all transmit signals appearing at the input/output terminals of transducer 86 be prevented from entering path 90 to avoid confusing the range finder receiver. This is accomplished by "blanking" circuitry in transmit and blanking generator 84 that functions in the same manner as the "blanking" circuitry in transmit and blanking generator 18 in prior art FIG. 1.

When path 90 is "unblanked" an electrical signal is generated by transducer 86 upon receipt of an echo of a previously transmitted burst of ultrasonic energy and this signal, after being rectified, is routed to path 90 through transmit and blanking generator 84. The rectified signal is routed to a capacitor in sample and hold means 94 where it is continuously sampled during time intervals that are small relative to overall receive signal duration (e.g., every 25 microseconds during a 1.1 millisecond duration receive signal). The just-mentioned capacitor in sample and hold means 94 is an integrating capacitor that integrates or sums sampled received signal voltages. Continuous signal presence is established if the magnitude of the sum of the sampled voltages always increases between successive samples and if the rate of increase is equal to or greater than a predetermined rate for the entire duration of a major portion of the receive signal. If the magnitude of the sum of the sampled voltages on the integrating capacitor in the sample and hold means 94 is always increasing, as determined by ΔV magnitude determining means 96, and the rate of change of said sampled and summed voltage is equal to or greater than a predetermined rate as determined by ΔV rate determining means 98, AND gate 100 will conduct and satisfy one of the two necessary inputs to AND gate 102. When transmit and blanking generator 84 "unblanked" path 90, as previously discussed, an interval timer initiating signal was set through path 104 to initiate time by interval timer 106 which for this particular range finder is 0.6 ms. If AND gate 100 continues to conduct for 0.6 ms, AND gate 102 will conduct when interval timer 106 produces a voltage at its output 0.6 ms from the time that a timer initiating signal was sent through path 104. When AND gate 102 conducts, switching means 108 will conduct and generate object detect signal 110 at its output. On the other hand, if either the sampled voltage magnitude fails to increase between successive samples as determined by 96 or if the rate of change of the sample voltage was less than a predetermined minimum rate, NAND gate 112 would conduct and send an initializing signal to sample and hold means 94 and interval timer 106 through path 114. This initializing signal would both reduce the voltage on the integrating capacitor in sample and hold means 94 to zero and reset interval timer 106 to zero, and then await the next interval timer initiating "unblanking" signal.

A more detailed explanation of how the spurious signal and electronic noise rejecting means of the present invention functions will now be described with respect to the logic flow diagram in FIG. 7, the spurious signal and electronic rejecting system block diagram of FIG. 6, and the return or echo portion of an object detection signal and the graph of integrating capacitor voltage of FIG. 8.

Figure 8:
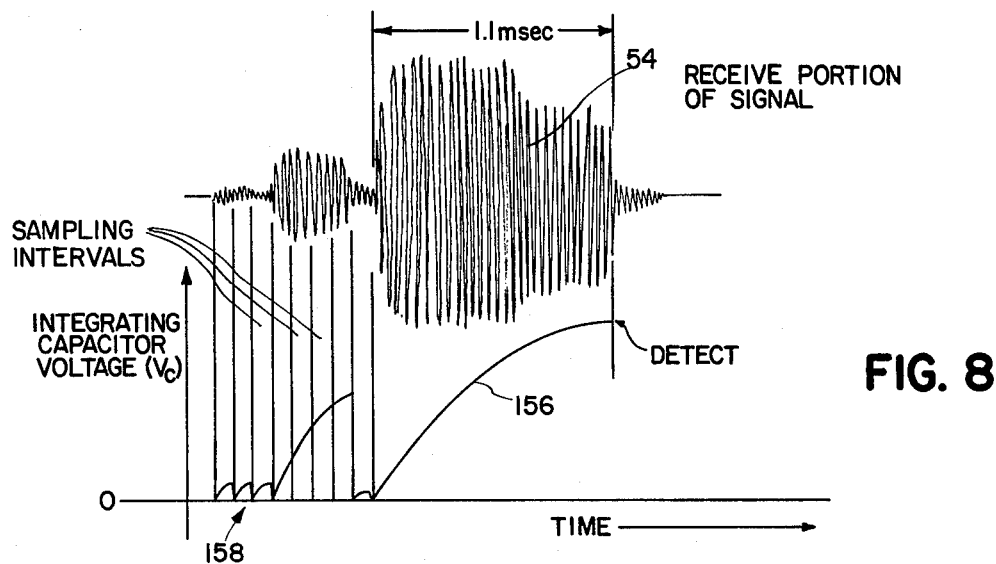
FIG. 8 is a primarily a representation of the returning or echo portion of an object detecting signal and a graph of the voltage corresponding to said signal on the small interval voltage summing capacitor of the present invention, as a function of time.
Figure 7:
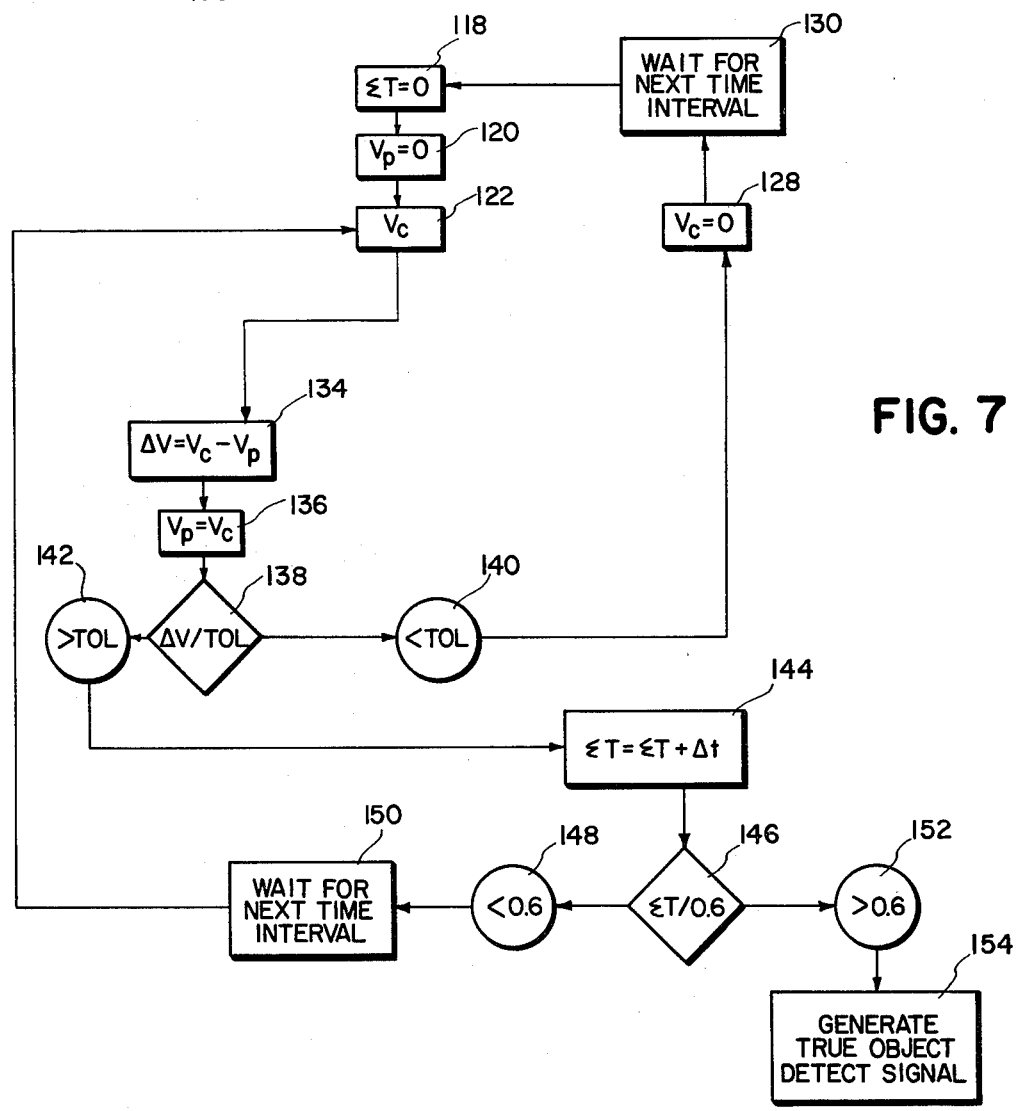
FIG. 7 is a logic flow diagram of the echo recognition system of the present invention.

Turning now to FIGS. 6, 7 and 8, in FIG. 8, upper trace 54 is primarily that of a receive signal of 1.1 ms duration. The lower portion of FIG. 8 is a graph of the integrating capacitor voltage in sample and hold means 94 as a function of time and receive signal strength. With reference to FIG. 7, the spurious signal rejecting means of the present invention is initialized by setting interval timer 106 (FIG. 6) to zero which corresponds to step (118) in the flow diagram of said FIG. 7, along with a storage location in, for example, a digital computer that stores information corresponding to the magnitude of the summed voltage ($V_p$) on the integrating capacitor in sample and hold means 94 during the previous sampling interval, said voltage corresponding to step (120). Stored $V_p$ (which was set to zero at [120]) is subtracted from integrating capacitor voltage $V_c$ which yields a $\Delta V = V_c - V_p$ (134). The storage location of $V_p$ is now set to the new $V_p$ (136) which, as stated above, is the magnitude of the summed voltage on the integrating capacitor in sample and hold means 94. $\Delta V$ is tested against a small value (close to zero) (TOL) (138) as to its magnitude. If $\Delta V$ does not exceed TOL (140) it means that $V_c$ did not increase fast enough over the last sampled interval and that the apparent receive signal has decayed into the background noise level or close to it. True receive signals beat, but never decay into the background noise level during the 0.6 ms or more of return signal passage. Therefore, if $\Delta V$ is less than TOL (140), we do not have a true signal and the voltage on the integrating capacitor $V_c$ is set to zero (128). We then wait for the next time interval (130) and initialize (118) and (120) and start over again. If, on the other hand, $\Delta V$ is larger than TOL (142), the time duration of the sampled interval is added to the interval timer (144) (and 106 in FIG. 6) and its elapsed time from "unblanking" is sampled to see if it exceeds 0.6 ms (146). If it does not exceed 0.6 ms (148), we wait for the next time interval (150). If it does exceed 0.6 ms (152), we generate true object detect signal 154.

In FIG. 8, the receive signal portion 54 of the object detection signal of FIG. 1A, along with a graph of the integrating capacitor voltage 156 of the integrating capacitor in sample and hold means 94 (FIG. 6) is illustrated. The charging and discharging of the integrating capacitor in sample and hold means 94 (FIG. 6) is shown at 158. When the integrating capacitor voltage increases, we must determine whether this signal is "spurious" or a true signal. Spurious signals do not usually persist for 0.6 ms. in the present system. Therefore, when the slope of the integrated signal goes to TOL/$\Delta T$ ($\Delta T$ being equal in time to a sampling interval), or if the slope is less than a predetermined one ($\Delta V$ less than TOL) (140), the system is initialized (118) and (120) after the integrating capacitor is discharged (128) and after the sampling interval had passed (130).

DISCUSSION

Prior art range finding systems of the type schematically depicted in FIG. 1 rely on signal shape or amplitude for target signal recognition. Unlike such prior art systems, the present system will detect a signal of energy returning from a selected target for any object, signal strength or pulse shape. The time of occurrence of the leading edge of a signal of energy or true echo can readily be established, to within one sampling interval, by determining the elapsed time between the first sampling interval of an actual or true echo from a selected target and the generation of an actual or true object detect signal and then subtracting said elapsed time from the time that said actual or true object detect signal is generated.

Beating signal 44 in FIG. 1A could well look like a true signal at the outset. However, since beat pulses do not usually exceed 140 microseconds, and electrical spikes do not tend to exceed 300 microseconds, the change in voltage between adjacent sampling intervals will be less than TOL in less than the 0.6 millisecond time interval of the present system. This will cause either beat pulses or electrical spikes to fail the test at (138) and take the logic path by way of 140 to set $V_c$ to zero and start over again (initialize). Thus, the primary feature of a range finding system incorporating an embodiment of the present invention is its immunity to "beating" and noise spikes (electrical and mechanical). False triggering is avoided because these types of signals cannot pass the 0.6 millisecond test. Range finding system accuracy is improved because a true echo signal is verified, in part, by its duration and therefore the range finding system is not dependent upon gain or signal shape as to when it triggers.

The typical echo signal shown in FIG. 2A, of the range finding system of the present invention, is of 1.1-1.5 ms. duration. For an echo signal of this duration, it has been empirically determined that if such a signal persists for 0.6 millisecond, this period of time is long enough to establish that the received signal is a true or actual echo signal and not a spurious one. The time duration of the total number of sampling intervals will be equal to this empirically determined length of time. This 0.6 millisecond period of time during which a received signal must persist in order to satisfy one of the test criterion of the echo recognition system of the present invention is not necessarily the same for all range finding systems utilizing such a recognition system. However, establishing a time period during which an echo signal must continuously persist is essential for the proper operation of the present echo recognition system.

When a true signal arrives, $\Delta V$ is greater than TOL (142) and remains so for more than 0.6 millisecond (144), (146) and (152). This causes the system to generate a true object detect signal (154) and a subsequent range signal that is always 0.6 millisecond closer than the object detect signal (154) indicates. This is a constant error of about 0.5 feet and can be readily subtracted out of the ranging system (either mechanically or electronically) to consistently, although indirectly, identify the leading edge of an electrical signal.

Because of its superior spurious signal rejecting capability, the present system can look at all received signals and not only those above a particular threshold level as in prior art arrangements, which further improves range finder distance determining accuracy.

It will be apparent to those skilled in the art from the foregoing description of my invention that various improvements and modifications can be made in it without departing from its true scope. The embodiment described herein is merely illustrative and should not be viewed as the only embodiment that might encompass my invention.

What is claimed is:

1. A method of detecting a previously transmitted signal of energy returning from a selected target in the presence of energy signals from the source of other than the target, comprising the steps of:
   continuously sampling said returning target signal for a number of consecutive time intervals that are of very short time duration relative to the total time duration of said target signal;
   establishing that the sampled target signal magnitude increases between consecutive sampling intervals;
   establishing that the rate of increase of target signal magnitude between consecutive sampling intervals is greater than or equal to a predetermined rate of increase; and
   establishing that said signal magnitude increase and said rate of signal magnitude increase between consecutive sampling intervals is continuous for at least a predetermined portion of the total time duration of said returning target signal.

2. In a ranging system having means for transmitting a burst of energy toward a selected target and for then receiving energy so as to detect an echo from said target, the improvement wherein said transmitting and receiving means includes:
   means for providing a sum signal by summing a received signal over a number of consecutive sampling intervals of very short duration relative to the anticipated duration of an echo from a typical target; and
   means for identifying an echo as received from said selected target only when said sum signal progressively increases during each consecutive interval over a predetermined time.

3. The improvement of claim 2 wherein said means for identifying an echo includes means for identifying an echo as received from said target only when said sum signal progressively increases over said consecutive intervals at a rate equal or greater than a predetermined positive rate.

4. The improvement of claim 3 wherein said means for identifying an echo includes returning said sum signal to an initial value each time said sum signal fails to increase or the rate of increase, during any given interval, is less than said predetermined rate.

5. The improvement of claims 2, 3 or 4 including means for determining the time of occurrence of the leading edge of the actual echo by subtracting said predetermined time from the time at which the echo is identified by said means for identifying an echo as received from said selected target.

6. A ranging method for detecting an echo from a selected target in the presence of spurious signals, said method comprising the steps of:
   summing the energy of received signals over a number of consecutive sampling intervals of short duration relative to the anticipated duration of an echo from a typical target so as to provide a sum signal; and
   establishing that an echo is received from said selected target only when said sum signal increases during each consecutive interval over a predetermined period of time.

7. The method of claim 6 wherein said establishing step includes comparing the rate of increase of said sum signal with a predetermined positive rate and identifying an echo as received from said target only when the rate of increase of said sum signal in each of said consecutive intervals exceeds said predetermined positive rate.

8. The method of claim 7 including the step of returning said sum signal to an initial value each time the rate of increase during any given interval is less than said predetermined positive rate.

9. The method of claim 7 wherein said predetermined period of time is a substantial portion of the anticipated duration of the echo.

10. The method of claim 6 or 7 wherein the leading edge of the actual echo is identified as occurring at a time equal to said predetermined time prior to the point of establishing that an echo is received from said selected target.

* * * * *